March 7, 1950

E. V. BERGSTROM ET AL 2,499,624

HEATING GRANULAR SOLIDS

Filed Jan. 4, 1947

ERIC V. BERGSTROM
AND
ERNEST UTTERBACK
INVENTORS

BY Oswald G. Hayes
ATTORNEY

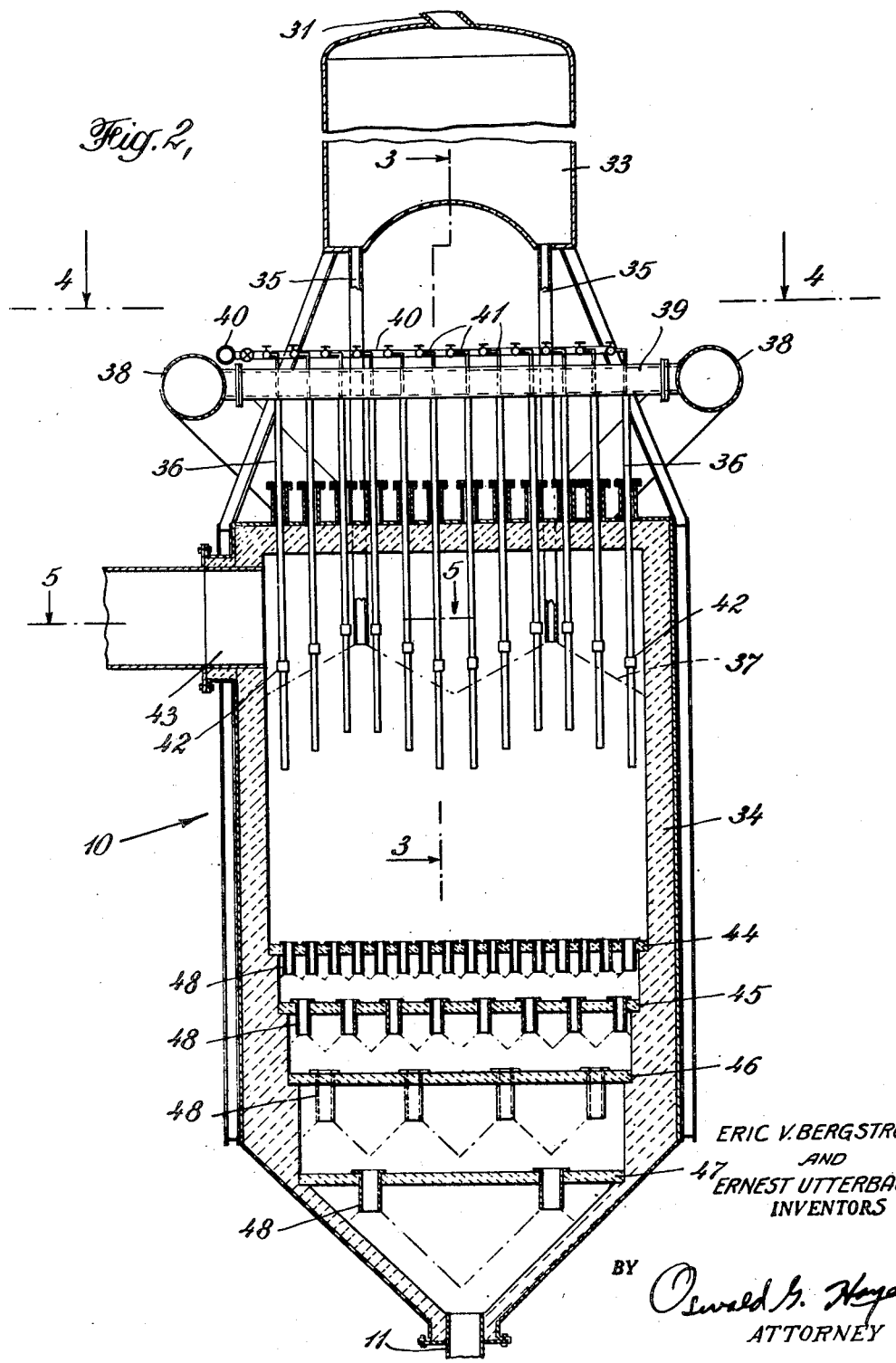

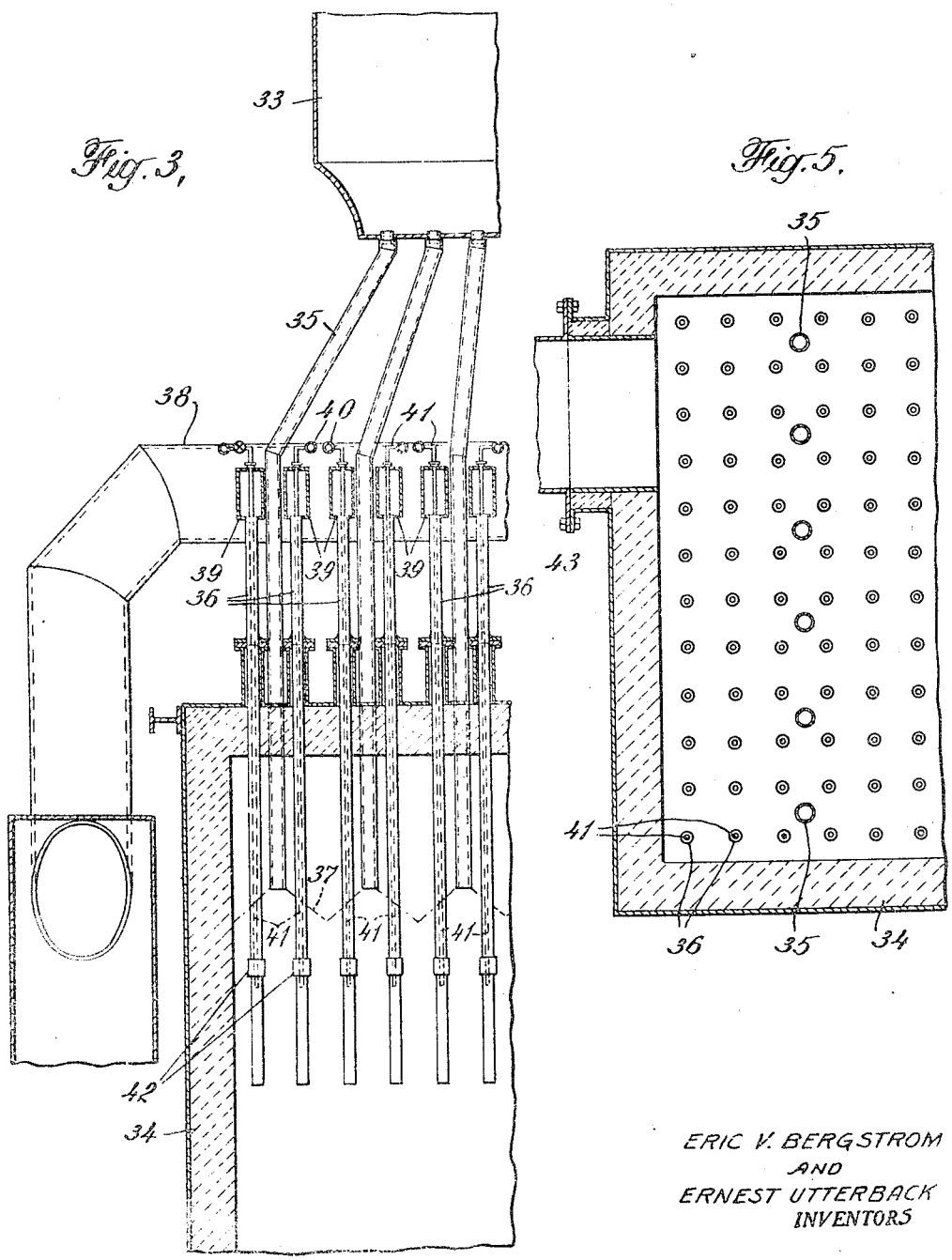

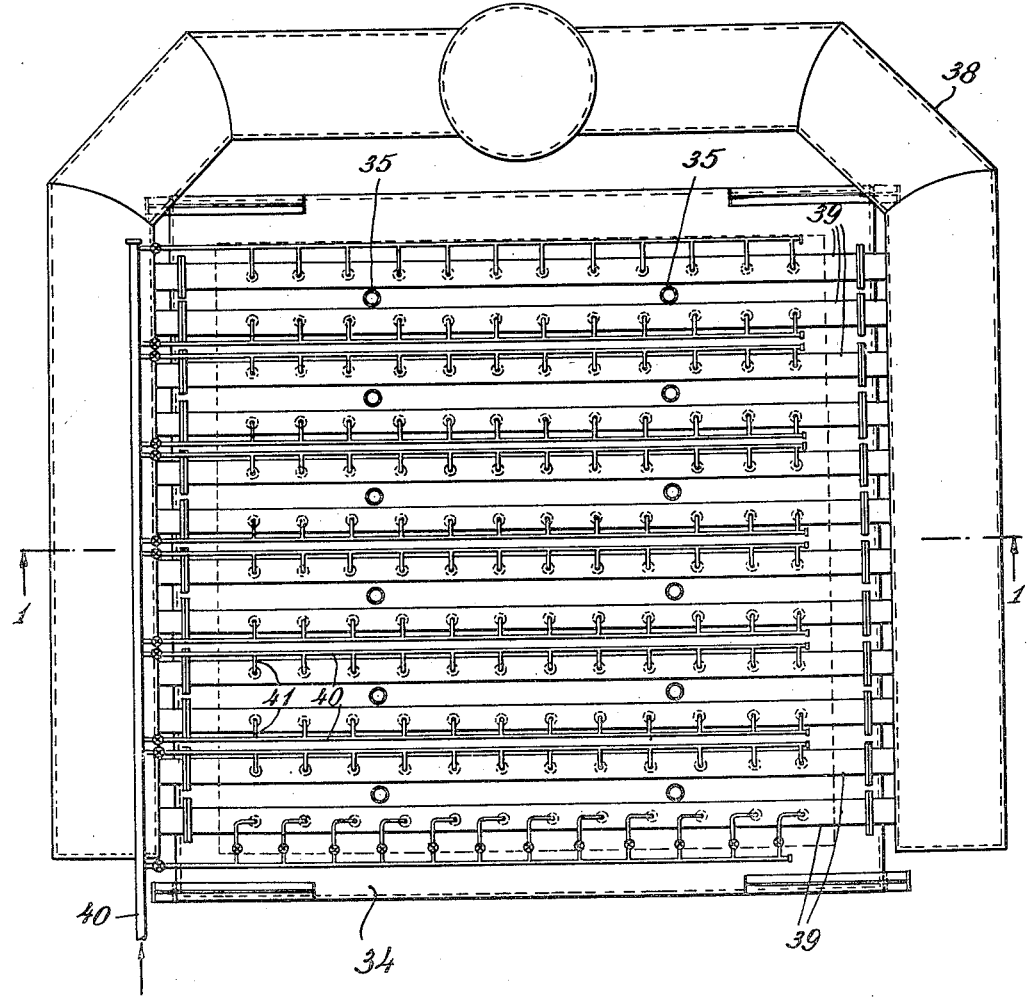

Patented Mar. 7, 1950

2,499,624

UNITED STATES PATENT OFFICE 2,499,624

HEATING GRANULAR SOLIDS

Eric V. Bergstrom, Short Hills, N. J., and Ernest Utterback, New York, N. Y., assignors to Socony-Vacuum Oil Company, Incorporated, a corporation of New York Application January 4, 1947, Serial No. 720,280

1 Claim. (Cl. 263—19)

This invention relates to a heater and process of heating granular solids. The invention is particularly concerned with a novel combination of means for flowing a granular solid downwardly as a substantially compact bed while flowing a mixture of fuel gas and air through tubes extending downwardly into the compact bed.

The invention is advantageously used to provide a continuous uniform stream of granular solid heat transfer agent heated to the desired degree. Such material may be employed for raising the temperature of fluid reaction mixtures or for efficiently heating air and other gaseous materials in a suitable contacting zone out of contact with the medium employed for supplying the heat, such as combustion gases. As an example of use to which hot granular solids may be put, reference is made to cracking of hydrocarbons at high temperatures and short reaction times to obtain selective thermal cracking. Thus, gas oil and many other aliphatic hydrocarbons and mixtures thereof may be readily converted to high yields of lower olefins such as ethylene by cracking at temperatures in the neighborhood of 1500° F. for reaction periods of about 0.2 second.

Such reactions are extremely difficult to conduct in a conventional thermal cracking apparatus wherein the charge is heated in tubes within a fired combustion chamber. In such apparatus the problem of rapid heating followed by prompt cooling is almost impossible to overcome and the carbonaceous substances resulting from the high temperature reaction rapidly coke up the tubes thus reducing capacity and heat transfer rates. The desired rapid heating to a carefully controlled temperature may be obtained by passing the charge countercurrent through a continuously moving bed of solid heat transfer granules. By this means the exit temperature of the gas is maintained constant because the temperature at the granular solid inlet is at a constant value. Heat exchange between the granular solid bed and a gas flowing therethrough is extremely rapid.

For similar reasons the hot granular solid is readily heated to the desired temperature by flowing hot combustion gases countercurrent through a moving bed of the granules. Some difficulties are encountered however, due to the large amounts of heat which must be put into the granules. If the combustion takes place at a point remote from the bed, very large amounts of gases must be passed in order to obtain the desired heating effect or the gases must be admitted to the bed at very high temperatures. In the latter event there is serious danger of fusing the surface of the granules since the heat exchange between the gas and the surface of the solid can raise the superficial temperature at a rate greater than the capacity of the solid to convey heat to its interior and thus protect the surface.

The present invention provides a process and apparatus for rapid heating of the granules wherein a mixture of fuel gas and air is passed without flame combustion to an open space within the bed wherein the mixture impinges upon a surface composed of granules and permeates the bed before or at about the time combustion is initiated. The combustion is thereby caused to take place in the presence of granules which take up the heat as liberated and thereby prevent the gases from reaching excessive temperatures which may cause fusion of granular particles.

The fuel-air mixture is formed at a point remote from the point of admission to the bed and flowed rapidly through a tube to a point of admission. This rapid flow insures adequate mixing of the fuel and air and also prevents premature ignition since the rate of flow is maintained at a value above the rate of flame propagation for the mixture being employed. It will be seen, therefore, that the fuel-air mixture passes in heat exchange relationship but out of direct contact with the hot granules in a direction of increasing granule temperature. This results in pre-heating of the gaseous mixtture, often to a temperature approaching the temperature of ignition. However, combustion is inhibited due to the high rate of flow. The lower ends of the tubes by which the fuel-air mixture is admitted act as baffles to the downwardly moving solids and thereby provide an inverted cone of open space within the bed to which the fuel-air mixture is admitted. As the gases leave the end of a tube they impinge directly on highly heated granules and are thereby brought to temperature well in excess of ignition temperature and combustion proceeds as the burning mixture passes upwardly through the bed. By these expedients, a rapid combustion is obtained and the heat is taken up by the solid granules as liberated. Due to the countercurrent nature of the contact, the combustion fumes may be withdrawn from the top of the bed at a temperature approximating the inlet temperature of the solid granules. As will be described hereinafter, the combustion and heating zone is so arranged as to provide a large plenum chamber above the bed of granular solids from which the spent combustion gases are discharged.

These and other objects and advantages of the invention will be apparent from the discussion below of a preferred embodiment of the invention shown in the annexed drawings wherein:

Figure 2 is an elevation in section of a heater to be used in the assembly of Figure 1;

Figure 3 is a fragmentary section on line 3—3 of Figure 2;

Figure 4 is a horizontal section on line 4—4 of Figure 2; and

Figure 5 is a fragmentary section on line 5—5 of Figure 2.

Figure 1:
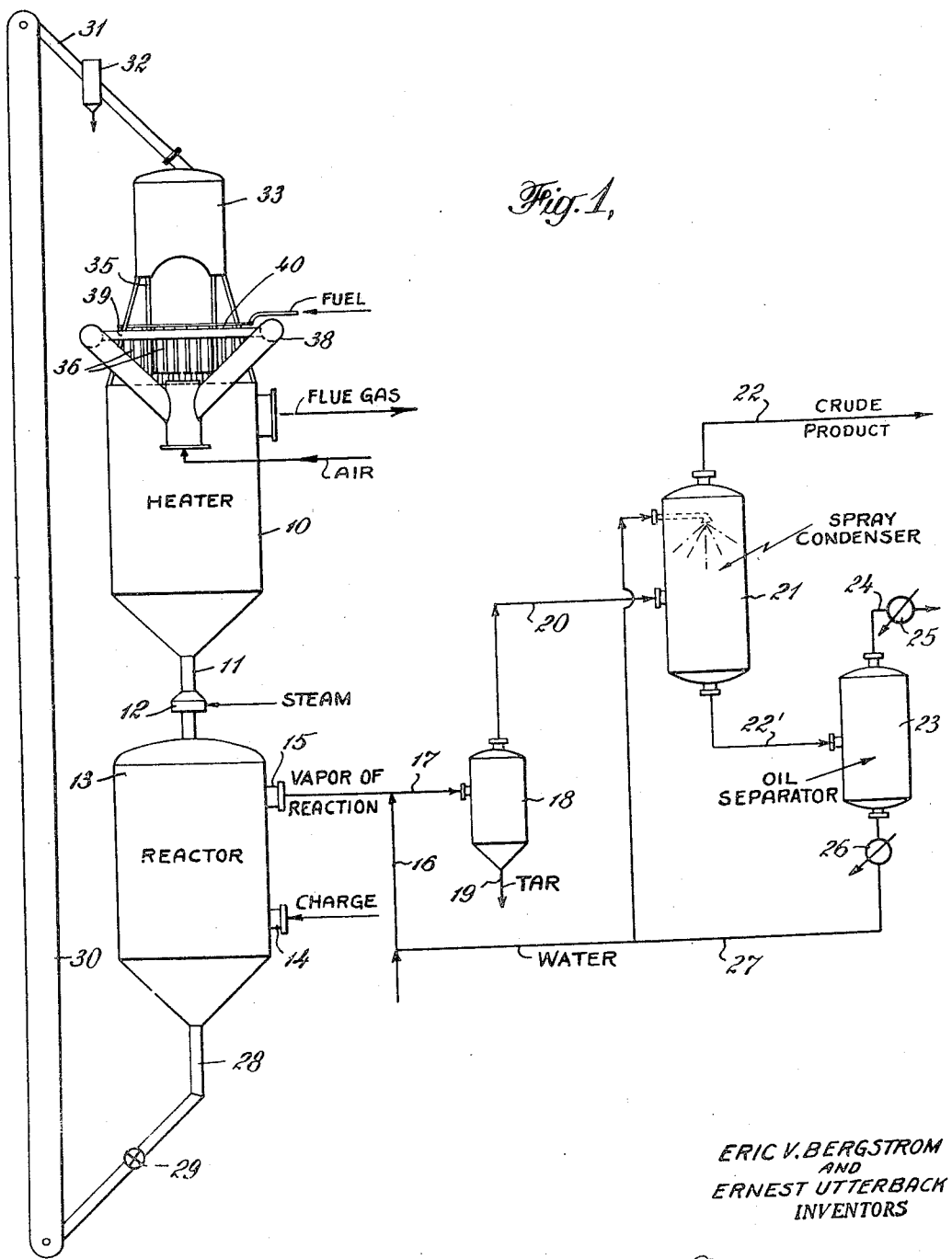
Figure 1 is a somewhat diagrammatic view of apparatus for continuously cracking hydrocarbons to produce ethylene.

Referring now specifically to Figure 1, hot granular solids are transferred from a heater 10 by way of a feed leg 11 having a steam sealing zone 12 to a reactor 13. A suitable hydrocarbon charge is supplied at inlet 14 and passed countercurrent to a moving bed of hot granular solids in the reactor 13 and withdrawn at outlet 15. A suitable quench medium from pipe 16 is added to the reaction vapors in transfer line 17 and the quenched mixture is then passed to a tar separator 18 from the bottom of which high boiling materials are withdrawn by line 19. Vapors are taken overhead from the separator 18 through transfer line 20 to a spray condenser 21 wherein they meet a spray of cold water which condenses materials which are liquid at atmospheric conditions. The remaining vapors are removed by transfer line 22 and passed to suitable purification equipment for recovery of the product. A mixture of water and liquid hydrocarbons is withdrawn by line 22 and passed to a settler 23 wherein the oil and water separate into two layers. The upper oil layer is withdrawn by line 24, cooled in heat exchanger 25 and passed to storage. The water layer is passed through heat exchanger 26 wherein it is cooled and is then recycled by line 27 to the spray condenser 21 and quench line 16.

Returning now to the granular solid heat transfer agent, this material is withdrawn from the bottom of reactor 13 by pipe 28 having a suitable valve 29, and is supplied to the bottom of elevator 30 whereby it is returned to the top of the heater 10 through a feed line 31 having a device 32 for the removal of fines. By suitable adjustment of the valve 29, the rate of flow from the bottom of reactor 13 is so controlled that a substantially compact bed is maintained in heater 10 and reactor 13 at all times. A hopper 33 on the top of heater 10 acts as a surge chamber to insure adequate supply of granular solids at all times.

The heater 10 comprises essentially a vertical shell 34, a plurality of feed legs 35 for transferring granular solid from the hopper 33 to the heating zone and a plurality of pipes 36 by which the mixture of fuel and air is admitted to the heating zone. Each of the pipes 35 extends from the bottom of hopper 33 to a feed level within the heating zone. Granular solids move downwardly through the feed legs 35 and replenish a moving bed therein as granular solids are withdrawn from the bottom of the heating zone. The granular solids discharged from pipes 35 form an upper surface for the bed as indicated in broken lines at 37.

A combustible mixture of fuel and air is formed in the tubes 36 from air supplied by headers 38 and ducts 39 by mixture with fuel from manifolds 40 and lines 41. The lines 41 extend part way down through the pipes 36 in the embodiment shown. It may also be noted that the upper portions of pipes 36 are formed of carbon steel while the lower portions which extend into the bed of granular solid are formed of alloy steels capable of withstanding the high temperatures involved. These two portions are suitably connected by couplings 42 as illustrated.

The lower end of each pipe 36 acts as a small circular baffle to provide an inverted cone of open space within the moving bed. The mixture of fuel and air flows through the pipe 36 wherein it is pre-heated by indirect heat exchange with the hot granules and hot combustion gases about the exterior of the pipes and is then discharged into the open space against a surface composed of highly heated granular solids. Combustion is immediately initiated and the burning gases pass upwardly to the upper surface of the bed and are discharged at port 43 to be passed to waste heat boilers and thence to the stack.

The heater is so constructed that there is a considerable depth of compact granular solids between the lower ends of the pipes 36 and the point of discharge for granular solids. These distances should generally be somewhat greater than the depth of bed above the point of fuel gas inlet in order to provide a zone of high pressure drop which induces the combustion gases to take the path of least resistance upwardly to the discharge port 43. This control is increased by introduction of an inert gas at higher pressure than that of the combustion zone at some point below the heating zone, as for example at the steam sealing device 12 shown in Figure 1. Steam may also be introduced for the same purpose at any of the open spaces in the lower part of heater 10, as for example between any two of flow control plates 44, 45, 46 and 47. These flow control plates are so arranged as to induce uniform withdrawal across the bottom of the bed by providing a large number of withdrawal points equipped with such control means as the lower three plates to induce uniform flow through all of the orifices. As shown, the orifices on the several plates are fitted with nipples 48 through which the solids pass.

We claim:

A process for heating a granular solid heat transfer material which comprises maintaining a bulk supply of said material above a heating zone, passing said material downwardly from said bulk supply as a plurality of laterally confined inlet streams to a plurality of points at about the same horizontal level in said heating zone, withdrawing a plurality of outlet streams of said material from a plurality of points at the bottom of said zone, combining the withdrawn outlet streams into a laterally confined discharge stream, regulating the linear rate of flow of said discharge stream to maintain a substantially compact moving bed of said material in said heating zone between the bottom of said inlet streams and the top of said outlet streams, passing a mixture of fuel gas and combustion supporting gas as a plurality of fuel mixture streams downwardly through said bed out of direct contact but in concurrent-flow, indirect heat exchange relationship with said bed at a linear velocity greater than the rate of flame propagation in said mixture to a plurality of flame points across the bed at about the same horizontal level in said heating zone intermediate the lower ends of said inlet streams and the upper ends of said outlet streams, baffling said material at said flame points to provide an open space to which said fuel mixture is introduced and projected against a surface composed of granules of said material, initiating combustion of said fuel mixture after it leaves said streams and passing the burning mixture upwardly through said bed from said flame points countercurrent to the flow of said material and the flow of said fuel mixture streams, disengaging said mixture from said bed at the upper surface thereof and exhausting the disengaged mixture.

ERIC V. BERGSTROM.
ERNEST UTTERBACK.

REFERENCES CITED

The following references are of record in the file of this patent:

UNITED STATES PATENTS

| Number | Name | Date |
|---|---|---|
| 1,253,342 | Bone et al. | Jan. 15, 1918 |
| 2,201,738 | Neve | May 21, 1940 |
| 2,386,670 | Evans | Oct. 9, 1945 |
| 2,432,503 | Bergstrom | Dec. 16, 1947 |